United States Patent
Chen

(10) Patent No.: US 9,841,611 B1
(45) Date of Patent: Dec. 12, 2017

(54) LENS EXCHANGING STRUCTURE OF SPECTACLES

(71) Applicant: PROHERO GROUP CO., LTD., Tainan (TW)

(72) Inventor: Pen-Wei Chen, Tainan (TW)

(73) Assignee: Prohero Group Co., Ltd., Tainan (TW)

( * ) Notice: Subject to any disclaimer, the term of this patent is extended or adjusted under 35 U.S.C. 154(b) by 0 days.

(21) Appl. No.: 15/290,311

(22) Filed: Oct. 11, 2016

(30) Foreign Application Priority Data

May 27, 2016 (TW) .............................. 105207909 U

(51) Int. Cl.
*G02C 1/08* (2006.01)

(52) U.S. Cl.
CPC ........... *G02C 1/08* (2013.01); *G02C 2200/06* (2013.01); *G02C 2200/08* (2013.01)

(58) Field of Classification Search
CPC ... G02C 1/08; G02C 2200/06; G02C 2200/08
USPC ................... 351/90, 93, 96, 95, 97, 116, 111
See application file for complete search history.

(56) References Cited

U.S. PATENT DOCUMENTS 8,851,667 B1 * 10/2014 Chen ........................ G02C 5/20
351/116

* cited by examiner

*Primary Examiner* — Tuyen Tra
(74) *Attorney, Agent, or Firm* — Rosenberg, Klein & Lee

(57) ABSTRACT

A lens exchanging structure of spectacles is disclosed. The lens exchanging structure of spectacles includes a trench disposed on a lens rim for receiving a lens. An open slot is disposed in the trench and has a long through hole having a first holey section and a second holey section. A moving part is placed in the open slot and has a bump disposed in the first holey section. A positioning part is disposed in the second holey section and assembled with the moving part. Therefore, the lens can be positioned or removed by the moving mechanism of the moving part in the open slot.

4 Claims, 8 Drawing Sheets

LENS EXCHANGING STRUCTURE OF SPECTACLES

BACKGROUND

Field of Invention

The disclosure relates to a lens exchanging structure of spectacles. More particularly, the disclosure relates to a lens exchanging structure of spectacles that can stably assembles lenses and conveniently change the lenses.

Description of Related Art

Spectacles on the market have many functions and styles. According to the functions, spectacles can be divided into optical spectacles, sunglasses, sport spectacles, and safety spectacles. According to the frame type, spectacles can be divided into rimmed spectacles and rimless spectacles. Customers can choose their needed spectacles according to their preferences and uses.

Presently, the rimmed spectacles are still the mainstream. The frame of the rimmed spectacles has two lens assembling holes. Two openings are disposed on two sides of the frame to communicate with the lens assembling holes. The top and bottom edges of the two openings have locking ears having corresponding locking holes, respectively, so that screws can penetrate therethrough and thus connect the two locking ears of the each opening. Hence, when lenses are assembled in the two lens assembling holes, opposite directional forces are applied on the top and bottom edges of the openings to enlarge the spacing of the openings and thus the diameters of the lens assembling holes for conveniently receiving the lens. Next, the user release the force applied on the top and bottom edges of the lens assembling holes, and the screws penetrate the locking holes of the locking ears disposed on the top and bottom edges of the openings to lock the locking ears to close the openings between the two locking ears, so that the lens can be stably fixed in the lens assembling holes.

According to the present design of the frame structure of the spectacles, when the lenses are needed to be exchanged, a special screw driver has to be used to release the screws for opening the openings of the lens frame. Then, the lens can be removed. Since the screws are very small, and thus can be easily dropped and lost if assembling and removing the lenses is not performed carefully. Moreover, the threads are very fine, and thus the threads directly applied by a screwdriver can be easily damaged or broken by the improper application of force. Therefore, it is quite inconvenient to assemble or remove lenses, especially for elders, and thus creates troubles and disadvantages in lenses exchanging.

Therefore, in view of the drawbacks in the present structures, the inventors develop a lens exchanging structure by the many-year manufacturing and design experience and knowledge in the related fields and ingenuity to achieve better utility.

SUMMARY

A main aspect of this invention is to provide a lens exchanging structure of spectacles. Especially, a lens exchanging structure of spectacles that can stably assemble lenses and conveniently change the lenses.

The main aspects and functions are mainly achieved by the following means.

The lens exchanging structure of spectacles includes a trench disposed on a lens rim for receiving a lens. An open slot is disposed in the trench and has a long through hole having a first holey section and a second holey section. A moving part is placed in the open slot and has a bump disposed in the first holey section. A positioning part is disposed in the second holey section and assembled with the moving part. Therefore, the lens can be positioned or removed by the moving mechanism of the moving part in the open slot.

In the lens exchanging structure above, the lens has an extrusion part corresponding to the open slot, and the extrusion part can be relatively limited or removed by the displacement of the moving part.

In the lens exchanging structure above, a locking hole is disposed on the bump of the moving part, a via hole is disposed on the positioning part. A screwing part penetrates the locking hole and the via hole to assemble the moving part and the positioning part and move them together in the open slot.

In the lens exchanging structure above, two opposite walls of the long through hole have floating bumps, and the bump of the moving part has notches corresponding to the floating bumps.

In light of the foregoing, it can be known from the assembling and the using of the structure of this invention that this invention has the following advantages, comparing with the present structure.

1. The lens exchanging structure of spectacles of this invention can limit the position of the lens or remove the lens by the moving mechanism of the moving part in the open slot.

2. The lens exchanging structure of spectacles of this invention can position the moving part to limit the position of the lens by the design of the floating bumps on the long through hole and the notches on the bump of the moving part.

DETAILED DESCRIPTION

To more completely and clearly illustrate the technical means and effects of this invention, the detailed descriptions are set forth below. Please refer to the disclosed figures and the reference numbers.

Figure 1:
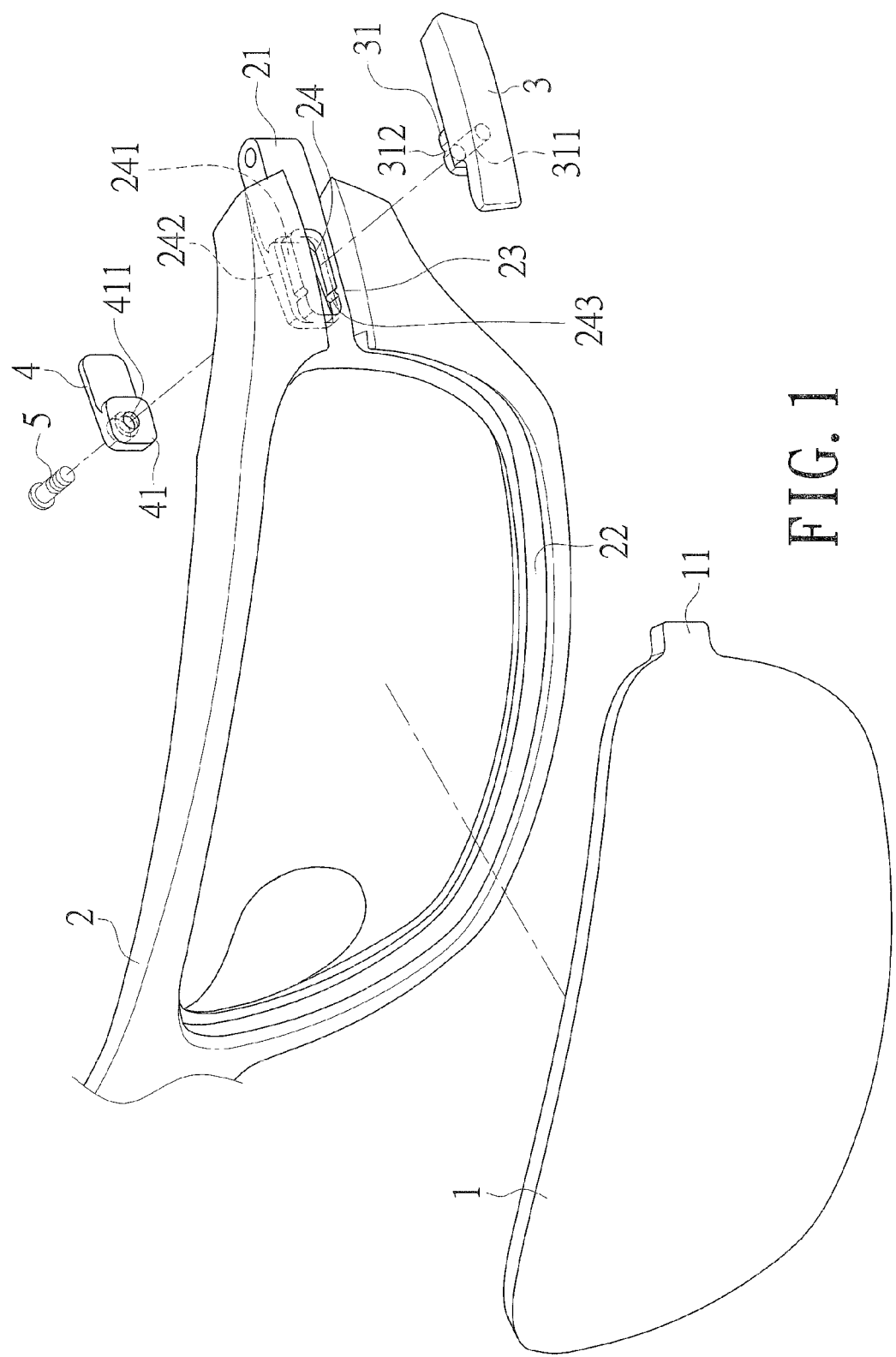
FIG. 1 is a perspective explosive diagram of this invention.
Figure 2:
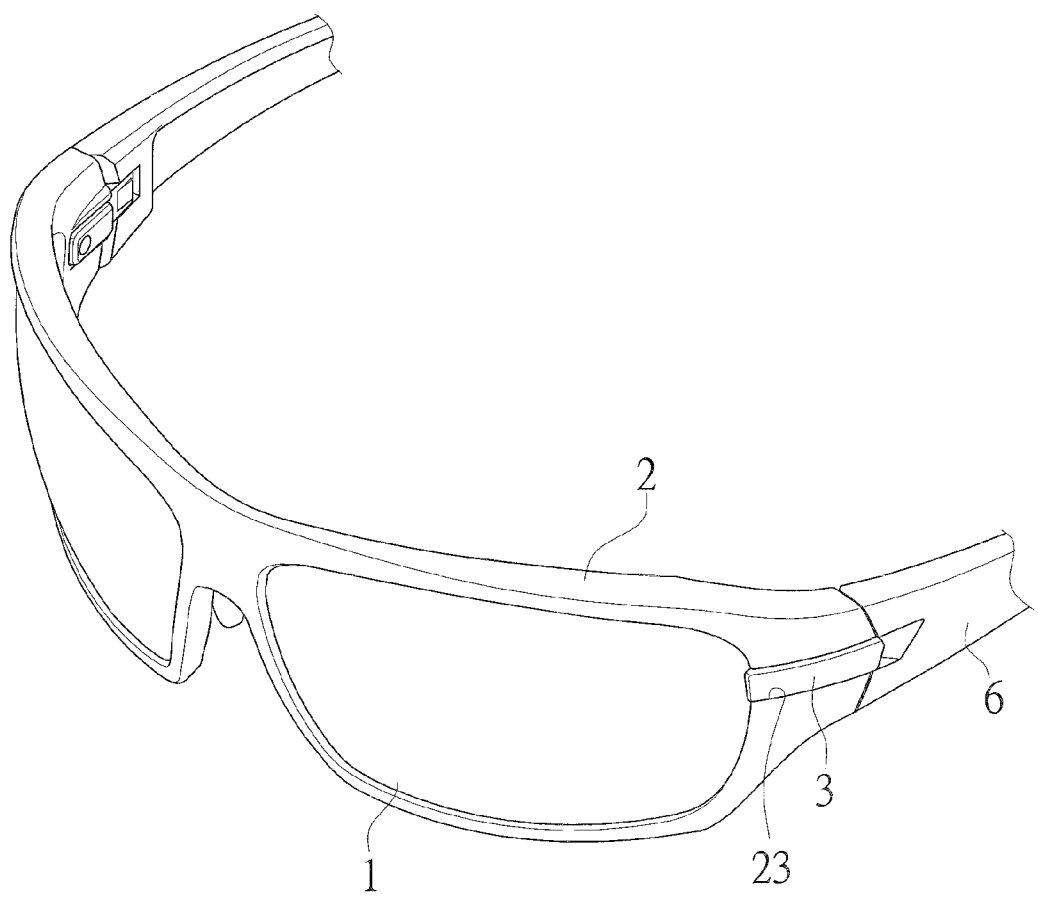
FIG. 2 is a perspective assembling diagram of this invention.
Figure 3:
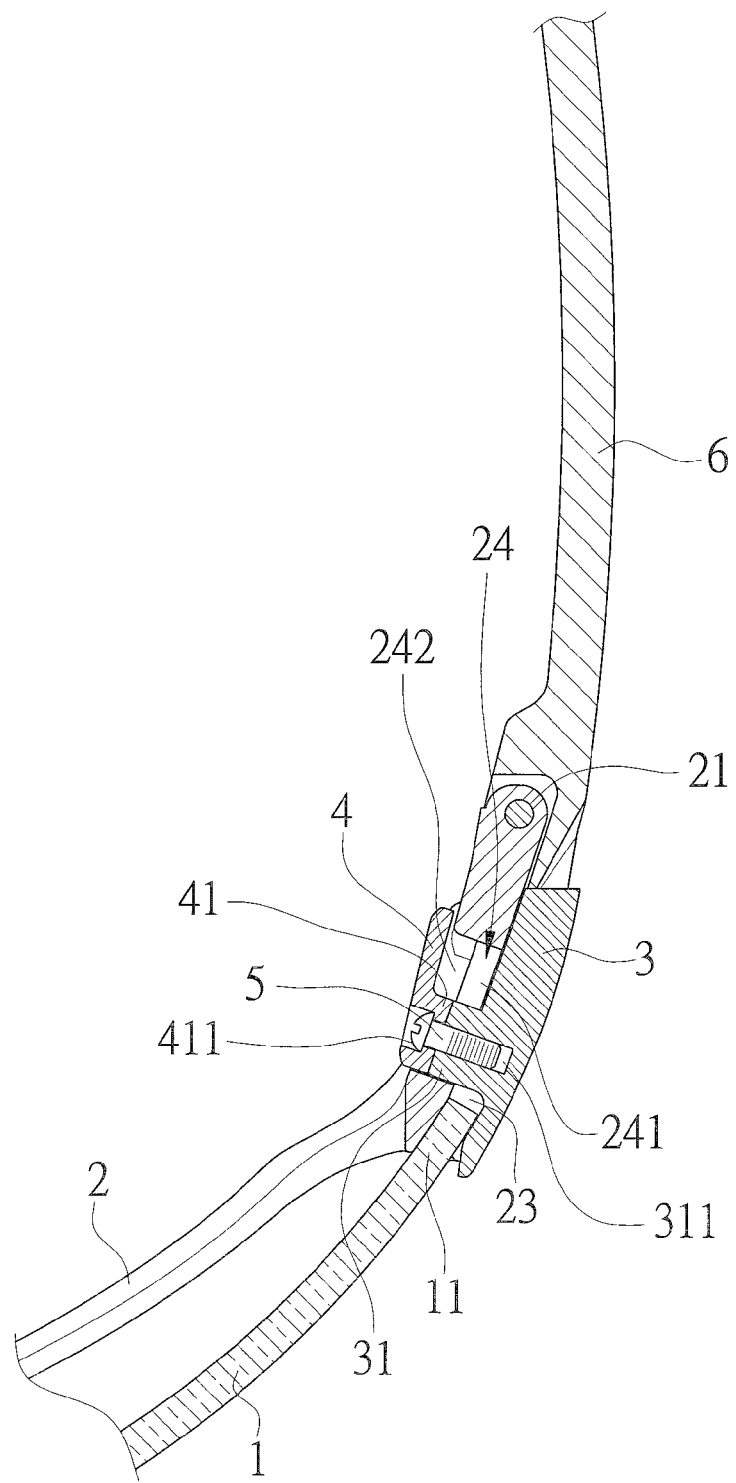
FIG. 3 is a cross-sectional assembling diagram of this invention.

Please refer to FIGS. 1-3, which is a diagram showing a lens exchanging structure of spectacles. Here uses a single glass exchanging structure as an example for illustration. The single glass exchanging structure comprises a lens 1, a lens rim 2, a moving part 3, a positioning part 4, and a screwing part 5.

The lens 1 has an extrusion part 11 disposed external side thereof.

The lens rim 2 has a pivoting end 21 for pivotally connecting a temple 6, and a trench 22 for receiving the lens 1. The trench 22 has an open slot 23 positioned at a position corresponding to the pivoting end 21, and the open slot 23 is corresponding to the extrusion part 11 of the lens 1. A long through hole 24 is disposed in the open slot 23 and has a first holey section 241 and a second holey section 242

The moving part 3 is disposed correspondingly to the open slot 23 and is movable along the open slot 23. A bump 31 is disposed on the moving part 3 and intercalated in the first holey section 241 of the long through hole 24.

The positioning part 4 has an intercalating part 41 disposed correspondingly to the second holey section 242 of the long through hole 24.

The screwing part 5 is used to lock and position the moving part 3 and the positioning part 4 in the long through hole 24.

When the parts above are assembled, as shown in FIGS. 1-3, the lens 1 is placed in the trench 22 of the lens rim 2, and the extrusion part 11 is positioned correspondingly to the end of the open slot 23. Next, the moving part 3 is placed in the open slot 23 and the bump 31 of the moving part 3 is inserted into the first holey section 241 of the long through hole 24. The intercalating part 41 of the positioning part 4 is disposed in the second holey section 242 of the long through hole 24. At the same time, a locking hole 311 is disposed on the bump 31 of the moving part 3, and a via hole 411 is disposed on the intercalating part 41 of the positioning part 4. The screwing part 5 penetrates the via hole 411 and is screwed in the locking hole 311 to assemble the moving part 3 and the positioning part 4. Since the bump 31 and the intercalating part 41 both are smaller than the width of the long through hole 24, the moving art 3 and the positioning part 4 can be moved along the long through hole 24. At this time, the moving part 3 is moved forward to against the extrusion part 11 of the lens 1 to let the lens 1 to be disposed in the lens rim 2. The pivoting end 21 of the lens rim 2 is then correspondingly assembled with the temple 6.

Figure 4:
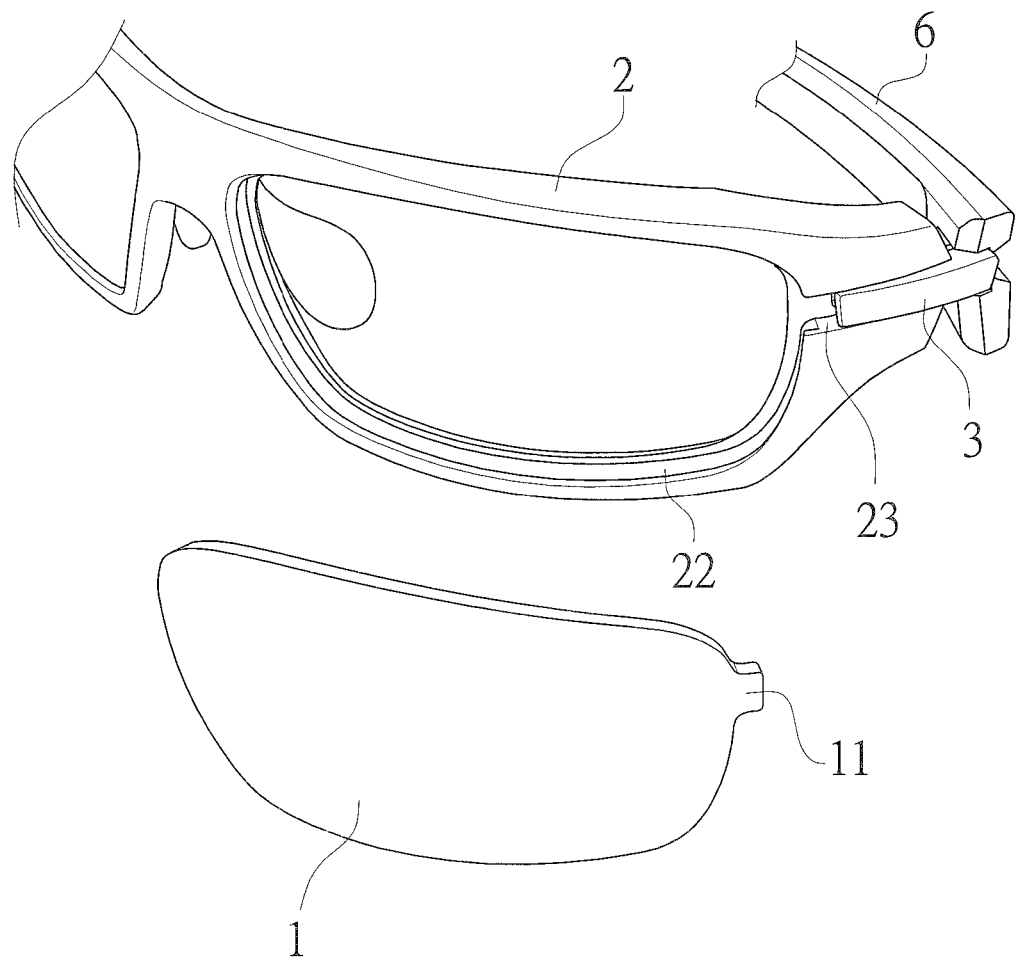
FIG. 4 is a perspective disassembling diagram of this invention.
Figure 5:
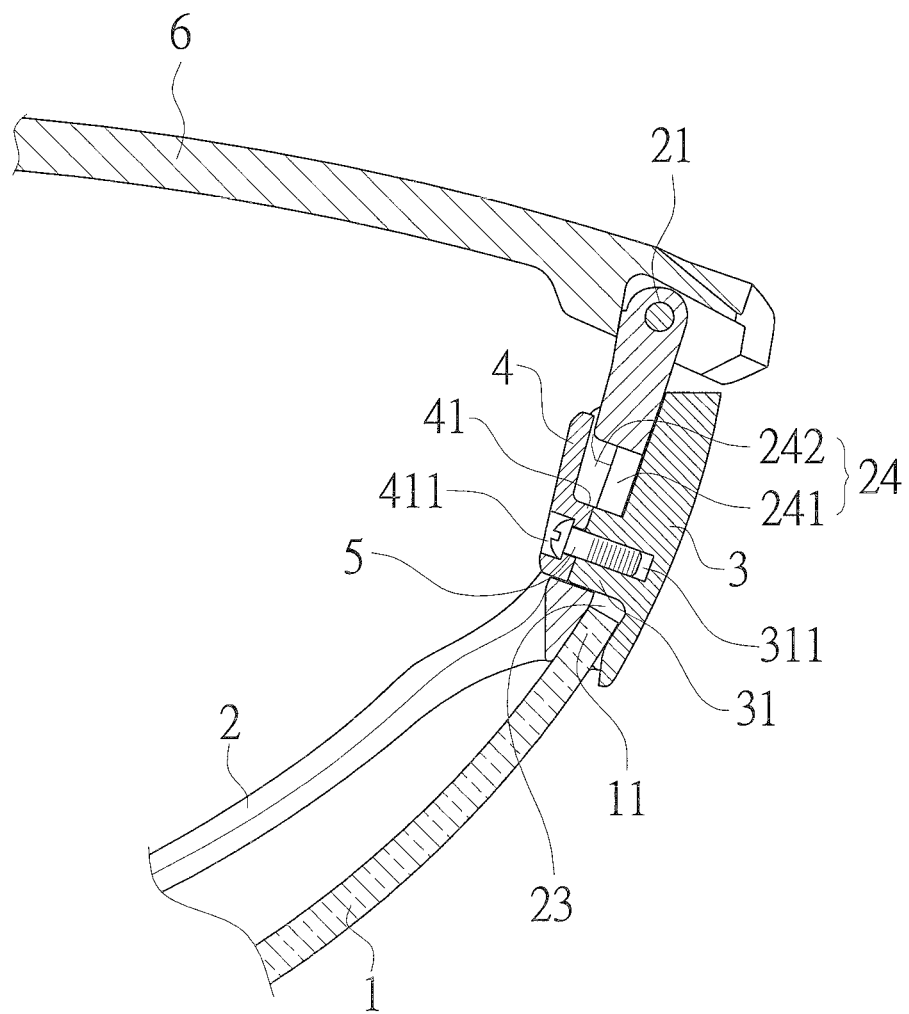
FIG. 5 is a first cross-sectional disassembling diagram of this invention.
Figure 6:
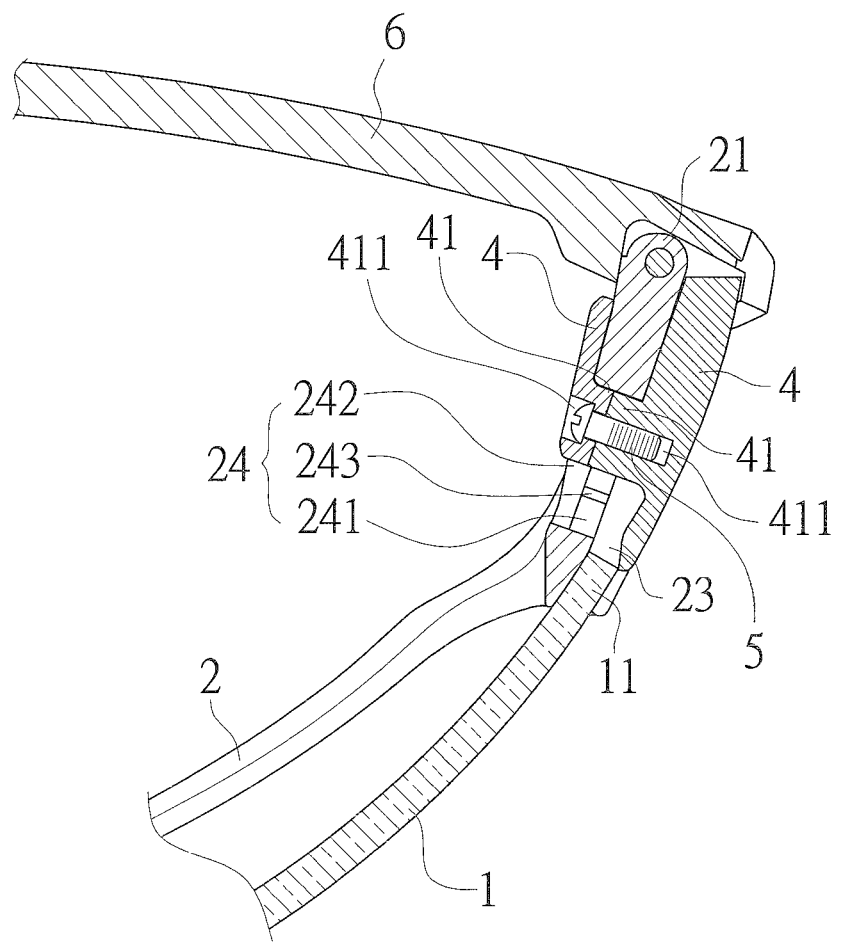
FIG. 6 is a second cross-sectional disassembling diagram of this invention.

Please refer to FIGS. 4-6. When the lens 1 is removed, the temple 6 is bent and the moving part 3 is moved backward in the open slot 23. At the same time, the bump 31 of the moving part 3 and the intercalating part 41 of the positioning part 4 moved in the long through hole 24, so that the moving part 3 is removed from the extrusion part 11 of the lens 1 to remove the lens.

Figure 7:
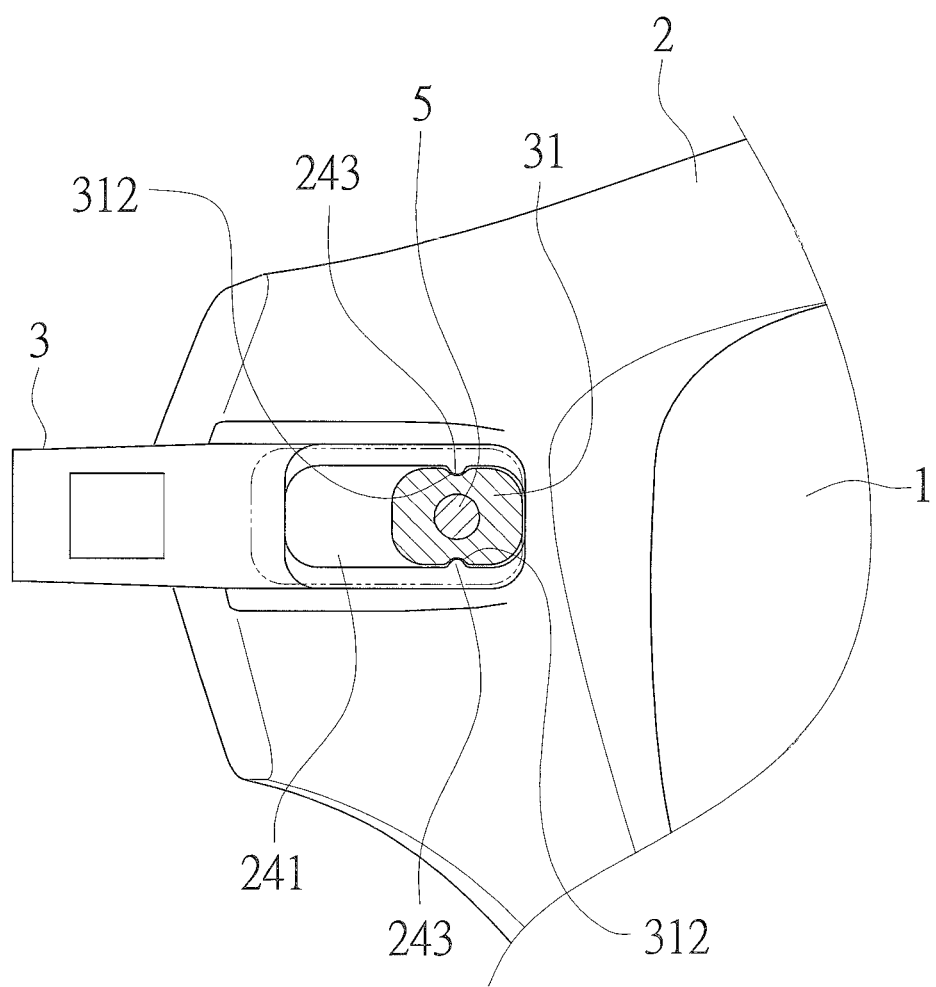
FIG. 7 is a first positioning diagram of this invention.
Figure 8:
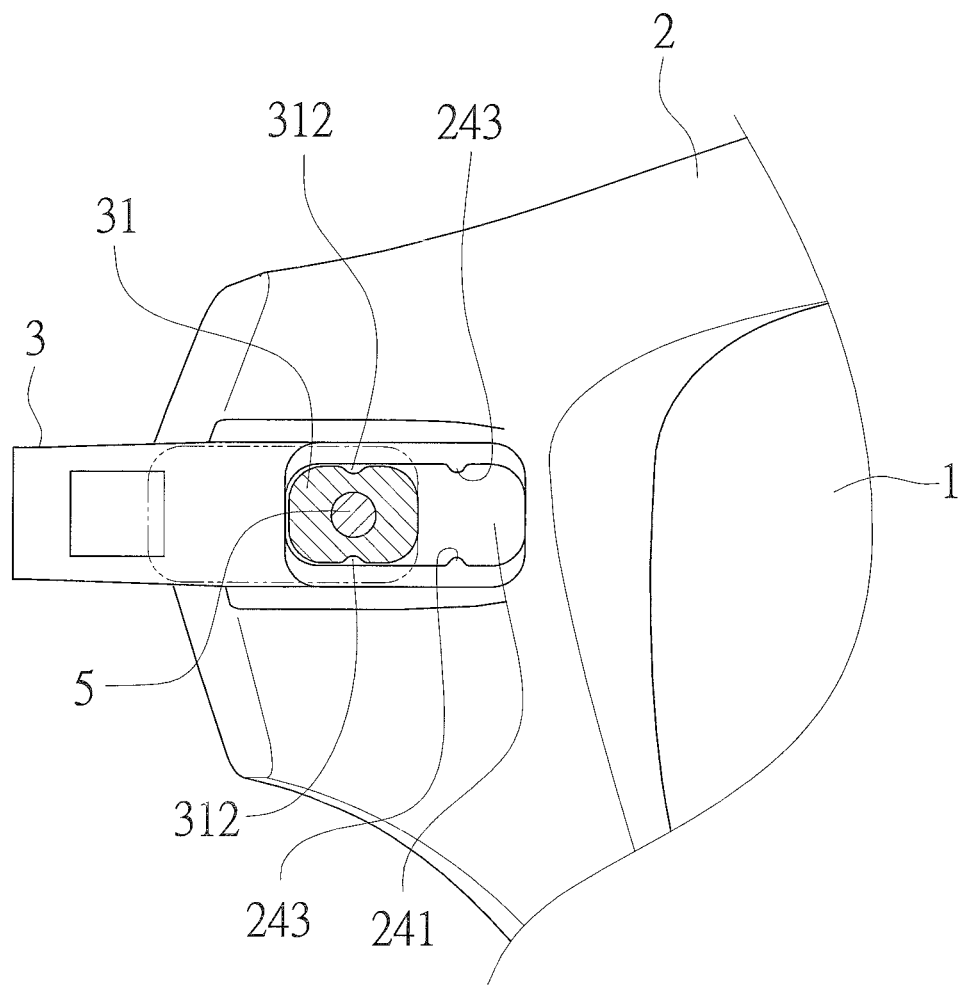
FIG. 8 is a second positioning diagram of this invention.

Moreover, please refer to FIGS. 7-8. Floating bumps 243 are disposed on two opposite walls of the long through hole 24, and notches 312 are correspondingly disposed on the bump 31 of the moving part 3. Accordingly, this concave-convex design is used to position the moving part 3 to limit the position of the lens 1.

In light of the foregoing, it can be known from the assembling and the using of the structure of this invention that this invention has the following advantages, comparing with the present structure.

1. The lens exchanging structure of spectacles of this invention can limit the position of the lens or remove the lens by the moving mechanism of the moving part in the open slot.

2. The lens exchanging structure of spectacles of this invention can position the moving part to limit the position of the lens by the design of floating bumps on the long through hole and the notches on the bump of the moving part.

What is claimed is:

1. A lens exchanging structure of spectacles, comprising:
   a lens having an extrusion part disposed external side thereof;
   a lens rim having a pivoting end for pivotally connecting a temple and a trench for receiving the lens, wherein the trench has an open slot corresponding to the extrusion part of the lens and a long through hole is disposed in the open slot and has a first holey section and a second holey section;
   a moving part disposed correspondingly to the open slot and being movable along the open slot, wherein the moving part has a bump intercalated in the first holey section of the long through hole;
   a positioning part having an intercalating part disposed correspondingly to the second holey section of the long through hole; and
   a screwing part is disposed in the long through hole for locking the moving part and the positioning part.

2. The lens exchanging structure of spectacles of claim 1, wherein the bump of the moving part has a locking hole, the positioning part has a via hole, and the screwing part penetrates the locking hole and the via hole to assemble the moving part and the positioning part.

3. The lens exchanging structure of spectacles of claim 2, wherein two opposite walls of the long through hole have floating bumps, and the bump of the moving part has notches corresponding to the floating bumps.

4. The lens exchanging structure of spectacles of claim 1, wherein two opposite walls of the long through hole have floating bumps, and the bump of the moving part has notches corresponding to the floating bumps.

* * * * *